E. C. MOORE.
VEHICLE SIGNAL.
APPLICATION FILED OCT. 7, 1916.
1,334,779.
Patented Mar. 23, 1920.
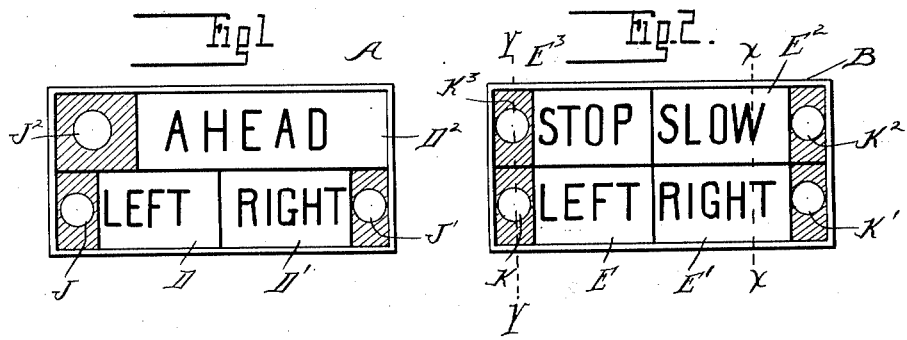
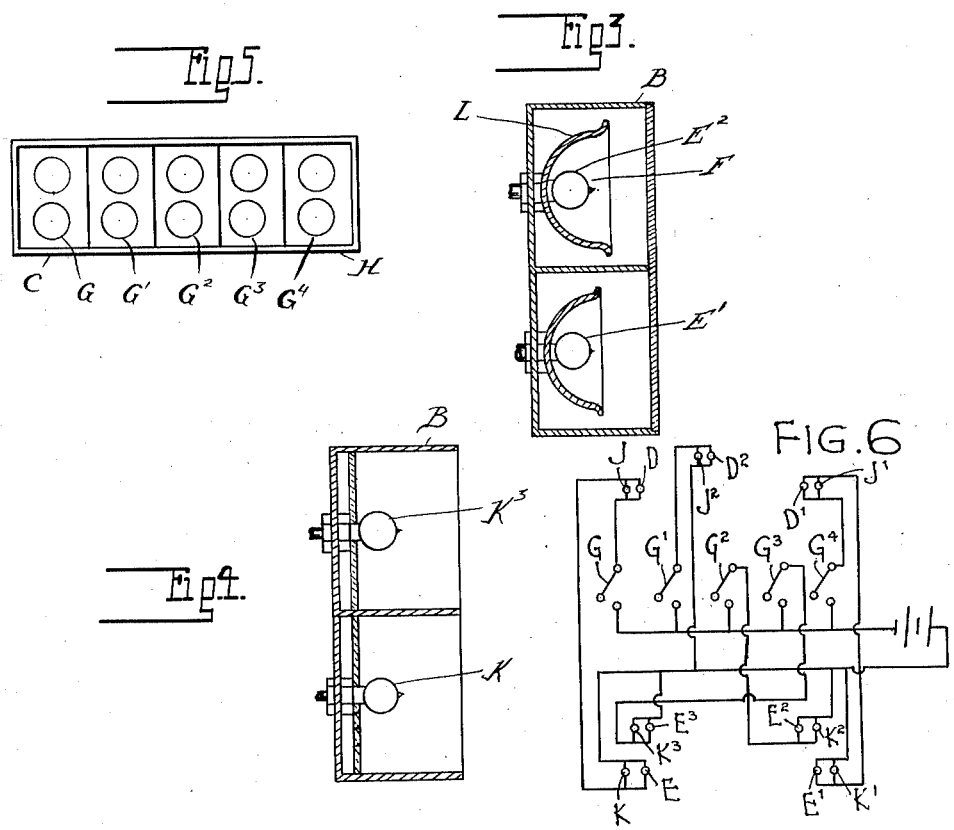
Inventor
Earl C. Moore

UNITED STATES PATENT OFFICE.

EARL C. MOORE, OF MASON CITY, IOWA.

VEHICLE-SIGNAL.

1,334,779.   Specification of Letters Patent.   Patented Mar. 23, 1920.

Application filed October 7, 1916. Serial No. 124,259.

*To all whom it may concern:*

Be it known that I, EARL C. MOORE, a citizen of the United States of America, residing at Mason City, in the county of Cerro Gordo and State of Iowa, have invented certain new and useful Improvements in Vehicle-Signals, of which the following is a specification, reference being had therein to the accompanying drawings.

This invention relates to vehicle signals and refers more particularly to signals for indicating the movement of an automobile or other vehicle.

Among the objects of the invention are to provide an improved vehicle signal by which the driver can indicate at both the front and at the rear of the car which direction he is going to turn or whether the vehicle is going to stop, slow down or go ahead; to provide an improved vehicle signal in which the glare of the sun shining upon the signal member will not prevent the effective signaling; to provide a construction in which a double signaling will be simultaneously produced so that if the ordinary lettering cannot be read because of the glare produced by the sun shining on the signal device, the lights having a dark background will indicate the direction; and in general to provide an improved and simplified arrangement of vehicle signal which can be conveniently operated from a small switchboard placed on the steering wheel or other accessible position.

The invention also resides in such details of construction and arrangements and combinations of parts as will more fully hereinafter appear.

In the drawings:

Figure 1 is an elevational view of a front signal light embodying my invention;

Fig. 2 is an elevational view of the rear light;

Fig. 3 is a cross sectional view on the line *x—x* of Fig. 2;

Fig. 4 is a cross sectional view on the line *y—y* of Fig. 2;

Fig. 5 is a top plan view of the electric switch.

Fig. 6 is a diagrammatic view showing the electric circuit.

Heretofore in the operation of signaling devices for use on automobiles, carriages, trucks, cars or other vehicles, the effective use of an electric or other illuminating signaling device has been prevented owing to the glare of the sun striking the signaling device. The use of a mechanically moving device for signaling is also undesirable in certain uses owing to the dust or other dirt particles interfering with the moving parts. The present invention therefore contemplates an improved signaling device which in general comprises a plate or other member illuminated by electric or other form of lighting and control mechanism by which the driver can connect into the current, a light or series of lights which will indicate the movement of the vehicle irrespective of the glare of the sun or other lights upon the device.

Describing in detail the construction shown in the drawings, A designates the front casing, B the rear casing and C the switch for controlling the lights. The front casing is divided into compartments D, D' and $D^2$ which are suitably lettered to indicate that the car will move ahead or will turn to the left or to the right depending upon the completion of the circuit leading to the bulb F in the respective compartments. The casing B is also divided into compartments one of which is marked Left and the other Right and preferably has additional compartments marked Stop and Slow. The lights in these various compartments are controlled by the switches G, G', etc., positioned upon a suitable switchblock (not shown). The latter can be mounted on the steering wheel or at any other point in the vehicle for convenient operation.

In addition to the lights in the compartments above mentioned, I preferably provide each of the casings with additional compartments corresponding to and located adjacent to an outer end of each of the other compartments, in which additional compartments there are located signal lights J, J' and $J^2$ and K, K', $K^2$ and $K^3$. These lights have a dark background so that in case the lights in the compartments marked "Ahead", "Left", etc., are blinded by the glare of the sun, the lights J, J', etc., will indicate the direction of the vehicle. The purpose of the dual arrangement of lights is to provide a relatively strong signaling device under normal conditions but to take care of the blinding of these lights when a bright sun is shining directly upon them. This arrangement also permits the use of reflectors L back of the bulb in the main compartments which could not be employed if no provision were made for overcoming the effect of the glare of the sun.

Assuming that a car is equipped with a signal device embodying my invention and the driver wishes to turn to the left the operation is as follows: Upon pushing the button G the circuit will be completed to the bulb in the compartment D and will shine through the transparent panel upon which is printed the word "Left". At the same time it will complete the circuit to the light J and also complete the circuit to the corresponding signals K and E at the rear of the car. Upon turning of the vehicle toward the right the operator will push the button $G^4$ and complete the circuits to the signal lights for the compartments D and D' and J', and E' and K'. In case the driver is going to slow down he pushes the button $G^2$ which will signal from the lights $K^2$ and $E^2$, or if the car has to be stopped, upon pushing the button $G^3$ a signal will be flashed by the lights $E^3$ and $K^3$. It will be noticed that this signaling effect for stopping and slowing the car is only given at the rear of the car and that the ahead signals $D^2$ and $J^2$ are only given in the front casing. The purpose of the ahead signal is to notify the traffic officer of the intention to go ahead. In each instance the casings are so arranged and so connected that the signal will be flashed effectively irrespective of any glare of the sun and without any additional effort upon the part of the driver.

The invention, however, is not limited to the particular arrangements and combinations shown and described, nor to the location of the signal lights as in certain cases it might be desirable to also have additional lights carried at one side of the vehicle. Various other changes can also be made within the scope of my invention.

What I claim as my invention is:

1. In a signaling device, the combination with a casing provided with a pair of compartments, one of said compartments having a dark back-ground, of illuminating means within each of said compartments and adapted to be illuminated at the same time.

2. In a signaling device, a casing provided with compartments, illuminating means for said compartments, additional compartments adjacent to said first-mentioned compartments, and illuminating means for said additional compartments having dark backgrounds.

3. In a signaling device, a casing provided with inner compartments, illuminating means for said inner compartments, reflector mechanism for said illuminating means and located within said inner compartments, outer compartments adjacent to said first-mentioned compartments, and illuminating means for said outer compartments having dark backgrounds, the illuminating means in the adjacent inner and outer compartments being adapted to be lighted at the same time.

In testimony whereof I affix my signature.

EARL C. MOORE.